(12) United States Patent
Willars et al.

(10) Patent No.: US 8,817,610 B2
(45) Date of Patent: *Aug. 26, 2014

(54) METHOD AND DEVICES FOR INSTALLING PACKET FILTERS IN A DATA TRANSMISSION

(75) Inventors: Per Willars, Vaxholm (SE); Reiner Ludwig, Hürtgenwald (DE); Hannes Ekström, Stockholm (SE); Henrik Basilier, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 219 days.

This patent is subject to a terminal disclaimer.

(21) Appl. No.: 13/010,137

(22) Filed: Jan. 20, 2011

(65) Prior Publication Data

US 2011/0122886 A1 May 26, 2011

Related U.S. Application Data

(63) Continuation of application No. 12/278,380, filed as application No. PCT/EP2006/001004 on Feb. 5, 2006, now Pat. No. 7,907,524.

(51) Int. Cl.
*H04L 12/26* (2006.01)

(52) U.S. Cl.
USPC .......................................... 370/230; 370/235

(58) Field of Classification Search
USPC .................. 370/229, 230, 235, 328, 335, 336,
370/345.346, 347, 354, 356, 357, 352, 289,
370/395.1, 401, 400, 402; 455/403, 410,
455/411, 375

See application file for complete search history.

(56) References Cited

U.S. PATENT DOCUMENTS 5,598,407 A  1/1997 Bud et al.
6,621,793 B2  9/2003 Widegren et al.
(Continued)

FOREIGN PATENT DOCUMENTS

EP  1 250 022 A1  10/2002
WO  WO 99/16266 A1  4/1999
(Continued)

OTHER PUBLICATIONS

U.S. Appl. No. 12/278,380, filed Dec. 10, 2009.
(Continued)

*Primary Examiner* — Dady Chery

(57) ABSTRACT

A method is described for associating a data packet (DP) with a packet bearer (PB) in a user equipment (UE1) of a communication network. The data packet is sent in a data flow from an application function of the user equipment, the packet bearer (PB) is established with the user equipment to transmit the data packet (DP) over the communication network towards a further entity, and the user equipment is adapted to establish different packet bearers. The method comprises the steps of identifying the flow with the data packet in a control entity of the communication network, determining the packet bearer for association with said flow from the different packet bearers in a policy function of the control entity, determining a routing level identification of the further entity, instructing the user equipment to install a packet filter based on the routing level identification, wherein the packet filter associates data packets comprising the routing level identification of the further entity with the determined packet bearer, providing the routing level identification to the application function, including the routing level identification into the data packet, and forwarding the data packet (DP) on the determined packet bearer (PB). A corresponding network, control entity, monitoring entity and computer program are also described.

15 Claims, 8 Drawing Sheets

(56) References Cited

U.S. PATENT DOCUMENTS

| | | |
|---|---|---|
| 6,747,986 B1 | 6/2004 | Charas et al. |
| 2002/0114305 A1* | 8/2002 | Oyama et al. ............... 370/338 |
| 2003/0039237 A1* | 2/2003 | Forslow ....................... 370/352 |
| 2003/0179726 A1 | 9/2003 | Forssell et al. |
| 2008/0279139 A1 | 11/2008 | Beziot et al. |

FOREIGN PATENT DOCUMENTS

| | | |
|---|---|---|
| WO | WO 01/86974 A2 | 11/2001 |
| WO | WO 02/067605 A1 | 8/2002 |
| WO | WO 02/073998 A2 | 9/2002 |
| WO | WO 03/105391 A2 | 6/2003 |
| WO | WO 03/105442 A2 | 12/2003 |

OTHER PUBLICATIONS

3$^{rd}$ Generation Partnership Project; Technical Specification Group Core Network and Terminals; Mobile radio interface Layer 3 specification; Core network protocols; Stage 3 (Release 7) 3GPP TS 24.008 v7.2.0 (Dec. 2005).

* cited by examiner

METHOD AND DEVICES FOR INSTALLING PACKET FILTERS IN A DATA TRANSMISSION

CROSS-REFERENCE TO RELATED APPLICATIONS

This application is a continuation of U.S. application Ser. No. 12/278,380, filed Dec. 8, 2008, now U.S. Pat. No. 7,907, 524, which was the National Stage of International Application No. PCT/EP2006/01004, filed Feb. 5, 2006, the disclosure of which is incorporated herein by reference.

TECHNICAL FIELD OF THE INVENTION

The present invention relates to a method for associating a data packet with a packet bearer in a user equipment of a communication network. Devices and software programs embodying the invention are also described.

BACKGROUND OF THE INVENTION

In many cases, data packets need to be sent over a communication network between a user equipment and a further entity. Transmissions can be performed both in downlink and uplink direction and the further entity is often another user equipment, e.g. in a telephone call. The further entity may also be a service entity like a server which may send different packet flows for sound and video to the user equipment, e.g. in a streaming session, while the user equipment may also send packets to the further entity. The further entity can either be part of the communication network or it is able to exchange data packets with the network.

The communication network can be a fixed or a mobile network. More than one network can be involved in the transmission, e.g. if the user equipment is located in a mobile network which is interfacing directly or via intermediate networks to a fixed network in which the further entity is located. Customary mobile networks comprise a core network with core network nodes, e.g. general packet radio service support nodes (GSN) like a serving general packet radio service support node (SGSN) or a gateway general packet radio service support node (GGSN). The core network nodes allow the exchange of data with external networks such as the Internet or mobile or fixed networks of other operators. Furthermore, customary mobile networks comprise one or more access networks with access network nodes for controlling the radio transmission to user equipment, commonly designated, e.g., as base station controllers, radio network controllers (RNC), Node B or base transceiver stations. Other implementations of the nodes and networks are possible, for example an enhanced GSN and an enhanced RNC which perform different parts of the SGSN functionality and thus allow omitting an SGSN.

An operator may offer services to the subscribers that generate different types of packet traffic, which are all transmitted over the communication network. Depending on the type of packet traffic, the requirements for the transmission differ significantly. For example, voice transmission requires low delay and jitter while a limited amount of errors can be acceptable. Streaming sessions using packet buffers typically allow higher delays and jitter and the receiver can generally also correct or hide errors. File transfer can often be performed as best-effort traffic but normally requires error-free data. In addition, operators may choose to offer different qualities of service (QoS) depending on the user subscription, i.e. they may choose to perform user differentiation. Accordingly, the provision of a defined quality of service is an important concept in the control of data traffic as described for example in technical specification 3GPP 23.107 V 6.3.0. of the $3^{rd}$ Generation Partnership Project "Quality of Service (QoS) concept and architecture".

Different contexts define the quality of service relating to a data transmission involving nodes of a communication network and the user equipment. The user equipment and a core network node negotiate a PDP (Packet Data Protocol) context which specifies parameters for the transmission of data packets to and from the user equipment over a 3GPP bearer. Further contexts can be set up for bearers relating to different links between the further entity and the user equipment, e.g. a context for the radio bearer between an access node and the user equipment, which specifies the transmission parameters on the radio link. Packet flows between the further entity and the user equipment are then mapped to bearers associated with these contexts and forwarded accordingly.

Current 3GPP standards define a mechanism to map downlink data to a packet bearer. For this purpose, the bearer is associated with a PDP context. The PDP context is the granularity with which QoS can be provided, i.e. different PDP contexts can provide a different QoS. The mapping of packets onto PDP contexts is done in an edge node of the communication network, e.g. in the GGSN using downlink Traffic Flow Templates (TFT). A TFT is a packet filter which defines rules that uniquely map incoming data packets onto a PDP context. The downlink TFT is part of the PDP context definition and can be configured to operate on a number of different parameters. For example, the IP source address of a data packet or the "Type of Service"-field (ToS) in the IP-header can be used to map packets onto a PDP context. The Session Management (SM) protocol is used to manage PDP Contexts.

In the uplink, the user equipment requires information how to map data packets from an application to a bearer with the associated context. However, this functionality is not in the scope of the current 3GPP standards. Instead, it is defined proprietarily and can differ between vendors of user equipment. In one implementation, the user equipment has several PDP context templates, each with a different associated QoS. A connection manager provides a mapping for each application to one of the PDP context templates. The mapping is a static configuration which creates a binding in the connection manager and which is signaled to the user equipment, e.g. by an SMS. Typically, the user performs the configuration by visiting the web-site of an operator and entering the phone model he is using and which application he wants to configure, e.g. WAP or MMS. Upon initiation of a session, e.g., when making a call, the application communicates to the connection manager through a proprietary API (Application Programming Interface). The connection manager associates the data packets from the application with the configured PDP context and, if required, sets up the context. Correspondingly, there is a static binding between application and PDP context template. The identifiers and formats used in the configuration can be specific for each vendor.

As a result, the existing methods for associating data packets with a bearer are inflexible and do not allow dynamic changes of the configuration. A further problem is that application development is both access specific and vendor specific, i.e. applications must be written for a specific access (e.g. 3GPP) and a particular vendor of user equipment because the QoS API in the above binding mechanism may differ for both vendor and access.

Furthermore, user equipment according to 3GPP specifications may consist of two entities, a terminal equipment (TE) and a mobile terminal (MT) which are logically and optionally also physically distinct. Applications are executed in the terminal equipment and data packets are exchanged over the mobile terminal with the mobile network. In the state of the art, an interface between TE and MT would be required over which it is possible to convey the bearer requirements of the application. As the binding of application and context is vendor specific in present user equipment, different interfaces would be required. If the terminal equipment is for example a personal computer and the mobile terminal is a mobile network card, the computer may need to support different interfaces for different card vendors, leading to high complexity and cost.

SUMMARY

With this background, it is an object of the present invention to propose a simple and flexible method for associating data packets with a bearer in a user equipment of a communication network.

According to the invention, the method described in claim 1 is performed. Furthermore, the invention is embodied in a communication network, a control entity, a monitoring entity, and a computer program as described in the other independent claims. Advantageous embodiments are described in the dependent claims.

The proposed method associates a data packet with a packet bearer in a user equipment of a communication network. The data packet is sent in a data flow from an application function of the user equipment. Although the flow may comprise only a single data packet, typically a plurality of data packets is sent in the flow. The packet bearer is established with the user equipment to transmit the data packet over the communication network towards a further entity, for example to another user equipment or to a server.

The establishment of the bearer can be triggered by the user equipment or by another entity in the communication network. The establishment can be performed at different times in relation to the other steps of the method as will be described below. The user equipment is adapted to establish different packet bearers. For example, the bearers may differ in the provided quality of service. Optionally, the user equipment may keep more than one bearer established simultaneously.

The method identifies the flow with the data packet in a control entity of the communication network. A policy function of the control entity determines the packet bearer for association with said flow from the different packet bearers. Preferably, the control entity is provided with operator policy rules to determine the selection of the determined bearers out of the different bearers which the user equipment is adapted to establish. In a UMTS (Universal Mobile Telecommunication System) network, the control entity can be for example a GSN or a PCRF (Policy and Charging Rules Function).

A routing level identification of the further entity is determined. This determination can be performed in the control entity or in another entity of the network which forwards the routing level identification to the control entity. The routing level identification enables the forwarding of data packets to the further entity. The routing level identification can be part of and used in the identification of the flow.

The user equipment is instructed to install a packet filter based on the routing level identification. The packet filter associates data packets comprising the routing level identification of the further entity with the determined packet bearer. The routing level identification is provided to the application function, for example in a signaling message originating from the further entity. The routing level identification is included into the data packet. Accordingly, the data packet is forwarded by the packet filter on the determined packet bearer.

The proposed method allows a simple and flexible association of data packets to packet bearers which does not require a prior configuration of the association and can be established before, at or after the initiation of a data session. The proposed method provides a controlled way for the communication network, i.e., the operator of the network, for mapping data packets onto bearers in the uplink from the user equipment to a further entity and thus to provide differentiation between services and between users. The network can allow or forbid the mapping of selected flows to bearers in the user equipment by the policy function controlling the filter installation. For this purpose, the operator may specify policy rules. In addition, the method enables access agnostic application development, i.e., applications can be developed independently of the access network to which the user equipment is connected because only ubiquitous socket API functions are used. This simplifies the development of applications making the development less expensive. The routing level identification can be set by the application through the socket API. The method does not introduce new dedicated signals to install the uplink packet filter but reuses existing procedures for this purpose and can accordingly easily be implemented in existing communication networks.

Communication networks typically comprise a plurality of entities. In a preferable embodiment, the control entity receives the determined routing level identification from a monitoring entity and instructs the user equipment to install the packet filter. The monitoring entity and the control entity may be implemented as parts of a single device or in different devices. The monitoring entity can for example monitor a signaling for session establishment between the user equipment and the further entity or data packets sent during an established session between the user equipment and the further entity. As the signaling for installing the filter and for session initiation have different receiving entities in the user equipment and will generally also be performed using different signaling protocols it is often not suitable to have a single entity for monitoring the session level messages and instructing the filter installation.

In an advantageous embodiment of the proposed method, an establishment of a communication session is initiated between the user equipment and the further entity by an initiation message. The initiation message comprises a session level identification of the further entity, e.g., in the format of a telephone number, a uniform resource locator (URL) or an e-mail address or any other session level identification. A monitoring entity is adapted to monitor messages sent between the user equipment and the further entity for establishing the session. The monitoring entity stores information related to the communication session. For example, the monitoring entity can be a call state control function storing a state for initiated sessions. The monitoring entity may be associated with an entity for performing an address resolution of the session level identification for forwarding the initiation message to the further entity. The initiation message is forwarded towards the further entity using the session level identification. The monitoring entity then waits for a reply message related to the establishment of the communication session and determines the routing level identification of the further entity from the reply message. It is possible to receive several reply messages and the routing level identification can be determined from one or several reply messages. The reply message is forwarded to the user equipment and the session establishment is completed. This embodiment allows a simple implementation to obtain the required information and to determine the identification of the flow, especially for the originating side of the session.

In an alternative embodiment of the proposed method, an establishment of a communication session between the further entity and the user equipment is initiated by an initiation message comprising a routing level identification of the further entity and a session level identification of the user equipment. A monitoring entity is adapted to receive the initiation message and to determine the routing level identification of the further entity from the initiation message. The initiation message is then forwarded towards the user equipment using the session level identification, and the session establishment is completed. This embodiment allows a simple implementation to obtain the required information and to determine the identification of the flow, especially for the terminating side of the session.

In a further embodiment, initial data packets sent by the user equipment on a first bearer are inspected, for example in the control entity or in a monitoring entity. The first bearer can be for example a default bearer or it can be established according to one of the preceding embodiments described. The flow for association is identified from the inspected data packets, e.g., due to information in the packet header, the packet content or other parameters of the data packets. Then, a second packet bearer is determined for association with said flow. The second bearer can then be established for the flow, a filter can be installed to associate the flow with an existing second bearer, or parameters of an existing bearer, e.g. the first bearer, may be modified for this purpose.

In an advantageous embodiment, the setup of the packet bearer is initiated by a request from a node in the communication network. This allows an improved control of the network operator over the transmission by the user equipment.

Preferably, the packet bearers differ in at least one associated item from a group comprising a quality of service, a charging tariff and an access point to which the packet is forwarded. Accordingly, the bearers can provide a different quality of service or may be charged differently or both and can be selected accordingly.

Typically, the user equipment comprises an executing unit for executing the application function and a transmission unit for sending the data packet on the associated packet bearer. In many cases the executing unit and the transmission unit are embodied in the same device, for example in a mobile phone. The units can be logically distinct, i.e. they may have a specified interface like for example a mobile terminal and a terminal equipment according to 3GPP specifications. It is also possible that the user equipment comprises physically distinct devices, e.g. the transmission unit may be a UMTS card or a mobile phone while the executing unit is part of another device connectable to the transmission unit, for example a computer or a television set with a wired or wireless connection to the transmission unit.

In a preferable embodiment, the data packet is an internet protocol IP data packet. This allows an easy implementation of the method in existing networks. Session initiation signaling can be performed using a session protocol which is based on the IP protocol. Suitable protocols are for example the session initiation protocol (SIP) or the real time streaming protocol (RTSP). Both can be used in conjunction with the session description protocol (SDP).

The routing level identification of the further entity preferably comprises a destination address and/or destination port number, for example an IP address and an IP port number.

The packet bearer can be established at different times before or during the described method. Often it is suitable to establish the bearer simultaneously with the filter installation.

In another embodiment, the bearer is set up before installing the packet filter. It is also possible to establish the bearer prior to establishment of a communication session in which the data packets are sent. In these cases, the packet filter can be installed in a modification procedure of the packet bearer. This embodiment is advantageous if the time required for bearer establishment is long compared to the time for filter installation.

In a preferable embodiment, the packet filter associates the data packet with the packet bearer based on at least one further parameter. In this way a finer granularity of the mapping between data packets and bearer may be achieved, e.g., to transmit packets with different quality of service or different charging. For example, the packet filter may evaluate further fields in the packet header, e.g. the source address, the source port number, further header fields like a differentiated services code point (DSCP), the protocol identification, or any combination of such parameters.

An advantageous communication network is adapted to perform any embodiment of the method as described above.

A preferable control entity is adapted for a communication network with a user equipment. An application function of the user equipment is adapted to send a data packet in a data flow and a packet bearer can be established with the user equipment to transmit the data packet over the communication network towards a further entity. The user equipment is adapted to establish different packet bearers.

The control entity comprises an input unit adapted to receive the flow with the data packet or information related to the flow. Accordingly, the control entity may be either part of the flow path or it may receive information related to the flow, e.g. source and destination, from another entity in the network. A processing unit of the control entity comprises an identification function adapted to identify the flow. A policy function is adapted to determine the packet bearer for association with said flow from the different packet bearers, e.g. according to rules specified by the operator of the network. As an example, the operator may specify that packets from a specific source or destination are forwarded on a bearer with specific parameters.

Furthermore, the processing unit is adapted to determine a routing level identification of the further entity with a determination function. Typically, the processing unit determines the routing level identification from a message received from a further entity in the network. An output unit is adapted to instruct the user equipment to install a packet filter based on the routing level identification, the packet filter associating data packets comprising the routing level identification of the further entity with the determined packet bearer. The input and output unit may be embodied in a common input/output unit. It is also possible that the control entity instructs further nodes to perform the signaling.

An advantageous monitoring entity is adapted for use in a communication network with a user equipment. An application function of the user equipment is adapted to send a data packet in a data flow. The packet bearer is established with the user equipment to transmit the data packet over the communication network towards a further entity, and the user equipment is adapted to establish different packet bearers. The monitoring entity comprises an input unit adapted to receive an initiation message comprising a session level identification of the further entity, the initiation message initiating an establishment of a communication session between the user equipment and the further entity. Preferably, the monitoring entity is also adapted to receive a reply message to the initiation message.

A processing unit of the monitoring entity is adapted to monitor the messages and to determine a routing level identification of the further entity from the initiation message or from the reply message. An output unit adapted to forward the initiation message towards the further entity using the session level identification and to forward the reply message to the user equipment. The monitoring entity is further adapted to forward the determined routing level identification to a control entity for instructing the user equipment to install a packet filter based on the routing level identification, wherein the packet filter associates data packets comprising the routing level identification of the further entity with the determined packet bearer.

An advantageous monitoring entity comprises a memory for storing an information related to the communication session.

The invention can also be embodied in a software program comprising code for performing the steps of the method relating to the device in which the program is executed. It is preferably executed in a control entity.

An advantageous program for associating a data packet with a packet bearer in a user equipment is adapted for a communication network, in which the data packet is sent in a data flow from an application function of the user equipment. The packet bearer is established with the user equipment to transmit the data packet over the communication network towards a further entity. The user equipment is adapted to establish different packet bearers, a routing level identification is provided to the application function, and the routing level identification is included into the data packet. The latter steps may be performed during or after execution of the program.

The program comprises program code for identifying the flow with the data packet in a control entity of the communication network. It determines the packet bearer for association with said flow from the different packet bearers. It determines also the routing level identification of the further entity, optionally from information received from another entity in the communication network. The program initiates an instruction to the user equipment to install a packet filter based on the routing level identification, wherein the packet filter associates data packets comprising the routing level identification of the further entity with the determined packet bearer. The program according to the invention is for example stored on a data carrier or loadable into a processing unit of a user equipment or a control device, e.g. as a sequence of signals.

The control entity, the monitoring entity and the software program can be adapted to any embodiment of the method described above.

The foregoing and other objects, features and advantages of the present invention will become more apparent in the following detailed description of preferred embodiments as illustrated in the accompanying drawings.

DETAILED DESCRIPTION OF PREFERRED EMBODIMENTS

Figure 1:
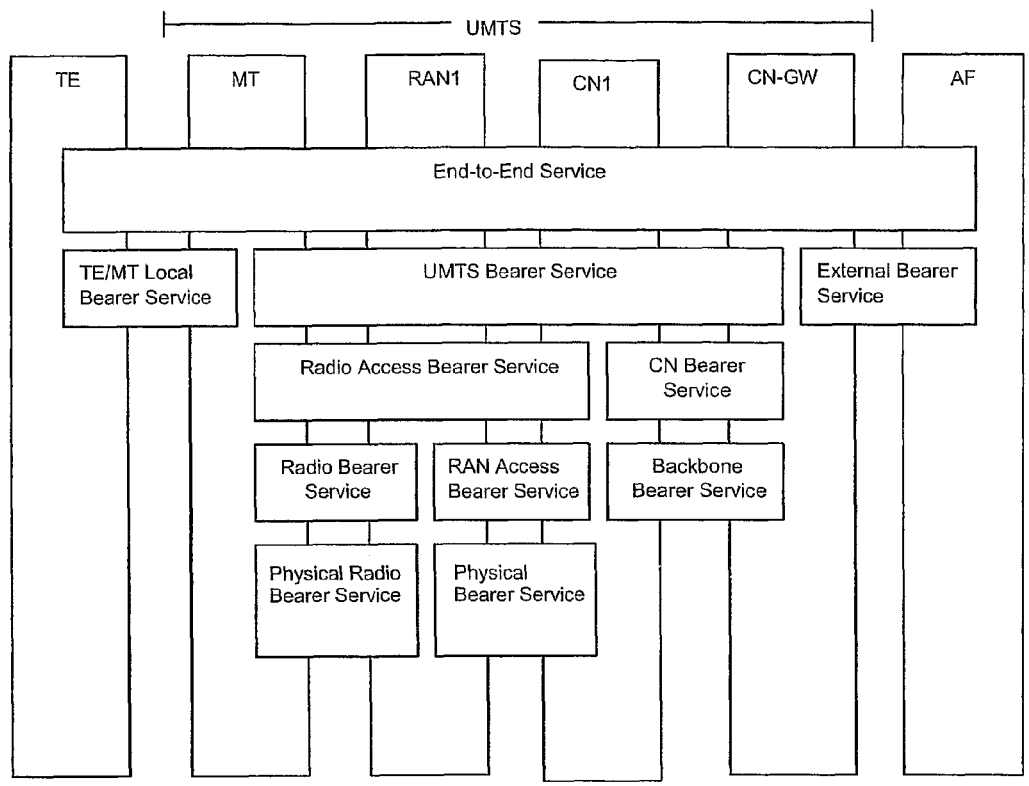
FIG. 1 shows an architecture for providing a defined quality of service in a mobile system.

FIG. 1 illustrates a quality of service concept in $3^{rd}$ generation mobile systems as specified in technical specification 3GPP 23.107 V 6.3.0. of the $3^{rd}$ Generation Partnership Project. Traffic comprising data packets is sent between a further entity (AF) and a user equipment comprising a terminal equipment (TE) and a mobile terminal (MT). The further entity (AF) may be a server which could be located in the operator's network or in an external network but it can be also another user equipment. The object of the concept is to provide a defined quality of service (QoS) on the application level using the bearer services of the underlying levels. Those bearer services are specified by contexts comprising attributes for defining the QoS of the respective bearer service. As the quality of the end-to-end service on the application layer depends on the specifications of the underlying levels, the contexts of the bearer services need to be specified with respect to the required end-to-end quality of service.

The TE/MT local bearer service forwards the data packets within the user equipment between the terminal equipment (TE) and the mobile terminal (MT). Accordingly, terminal equipment (TE) and the mobile terminal (MT) may be part of a single device or may be embodied in different devices utilizing communication via the TE/MT local bearer service. The data packets are received or sent over a radio link with the radio access network (RAN1) of the mobile network. The External Bearer Service is provided by another network which can also be a UMTS (Universal Mobile Telephony System) network, i.e. a network according to 3GPP specifications, another mobile network or a fixed network like a fixed communication system such as the Internet. The external bearer forwards data packets between the further entity (AF) and an edge node (CN-GW) of the core network of the mobile network.

The core network comprises also a core network node (CN1) which controls the forwarding of packets between core network and radio access network (RAN1). Edge node (CN-GW) and core network node (CN1) can be the same node. The data packet traffic through the mobile network is sent over a Radio Access Bearer Service between mobile terminal (MT) and core network node (CN1) and over a Core Network Bearer Service between Gateway node (CN-GW) and core network node (CN1). These Services are in turn provided by a Radio Bearer Service on the radio link between user equipment and radio access network (RAN1), a RAN Access Bearer Service between radio access network (RAN1) and core network node (CN1) and a Backbone Bearer Service within the core network. Ultimately, all services depend on different physical bearer services on the respective links, i.e. typically a plurality of contexts and services relate to individual links in a transmission.

Figure 2:
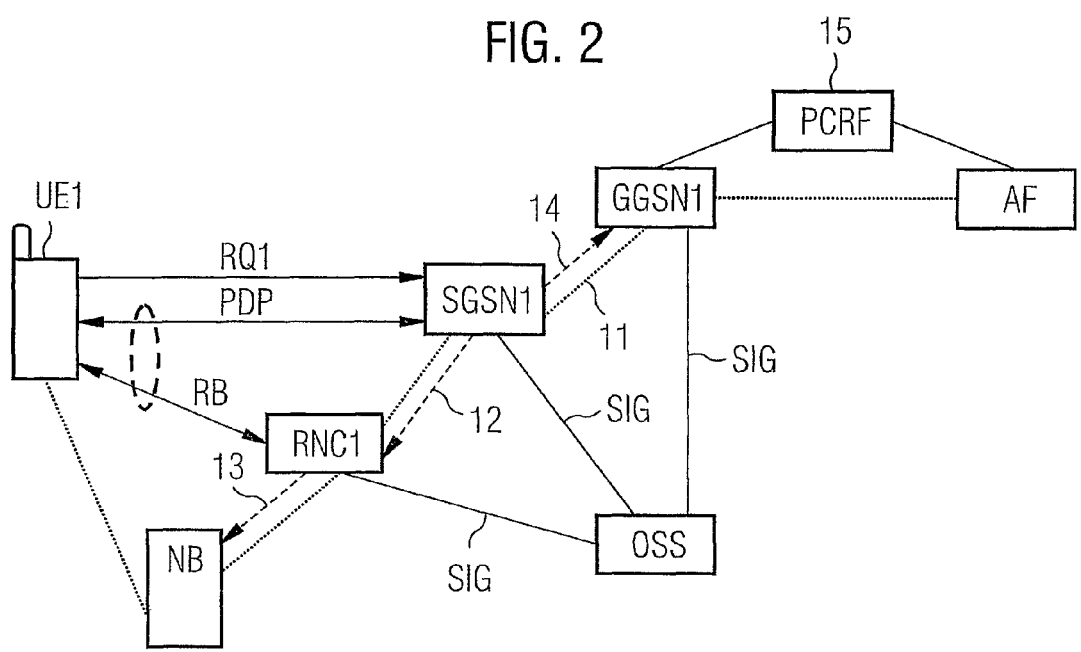
FIG. 2 shows the cooperation of nodes in a mobile system in which the invention is embodied.

FIG. 2 shows an example of a transmission of data packets using the proposed method with involved contexts and nodes. For the transmission of the data packets, a PDP context (PDP) is negotiated between the user equipment (UE1) and a core network node, here an SGSN (SGSN1). The transmission is later performed via core network node and access node or at least controlled by them. The dotted line 11 indicates a possible route on which the packets are forwarded in up-link and down-link direction between the user equipment (UE) and the further entity (AF). A control entity (PCRF) has interfaces to communicate with a GGSN (GGSN1) as edge node and with the further entity (AF).

The set up of the PDP context can for example be initiated by a corresponding request (RQ1) from the user equipment to the SGSN. It is also possible that the network (e.g., the GGSN) requests the set up of the PDP context (PDP), for example by a message to the user equipment which then initiates the sending of a request (RQ1) to activate a PDP context.

The PDP context comprises attributes which define the quality of service for the packet transmission. The establishment of a radio bearer (RB) is typically included in the establishment of a PDP context. For that purpose, the SGSN (SGSN1) sends a request (12) for establishment of a radio bearer (RB) to an access node, in the example an RNC (RNC1). The transmission of the data packets on the radio link to the user equipment is for example performed by a node B (NB) which is controlled by the RNC using radio resource control signaling (13). It is also possible to integrate the functionality of the node B and the RNC in a single node. The SGSN sends also a request (14) to an edge node of the core network, here a GGSN (GGSN1), for the establishment of a core network bearer. The configuration of the different nodes can be performed from an operation support system (OSS) over signaling links (SIG).

Figure 3:
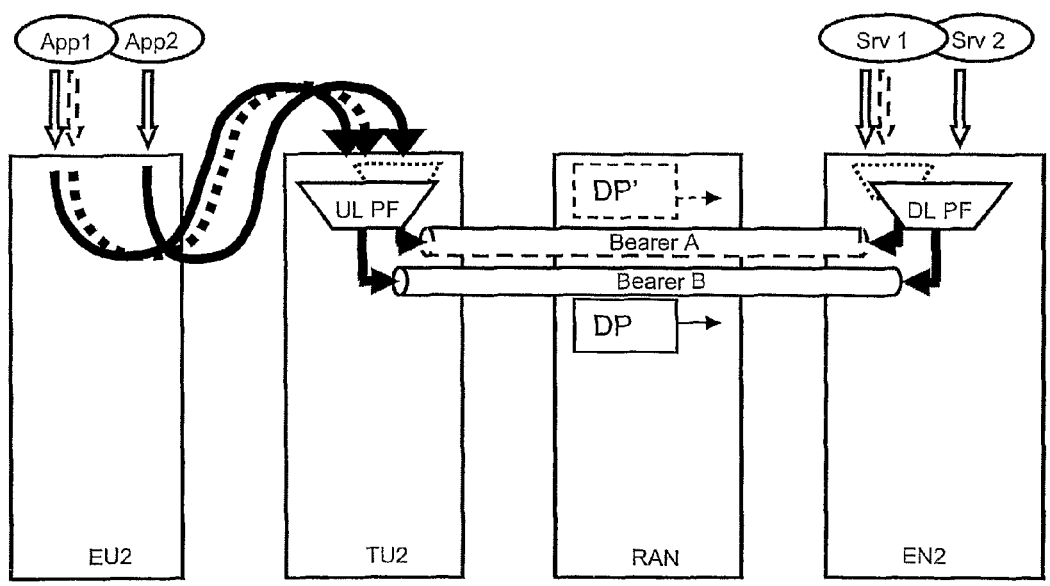
FIG. 3 shows devices performing the method for associating data packets to bearers.

FIG. 3 illustrates the basic concept of the proposed method for the example of a UMTS network. In the network, a GGSN as edge node (EN2) and a Radio Access Network (RAN) provide two bearers with different characteristics denoted Bearer A and Bearer B. The bearers may differ in many different ways. Two examples of the characteristics could be the QoS associated to the bearers or the charging policy associated to data packets transmitted over the bearer. The GGSN comprises down link packet filters (DL PF) which map packet flows generated by different services onto the bearers. To indicate the association of packet filters and bearers, both are indicated by broken lines for bearer A while bearer B and the associated filters are indicated in continuous lines. A packet flow is a group of data packets with the same source, destination, and protocol. For example, an IP flow consists of data packets with the same source address, source port, destination address, destination port, and protocol identification.

In the example, a first service (Srv1) generates two application flows, and a second service (Srv2) generates one application flow which are mapped onto the bearers by the down link packet filters (DL PF). The data packets originating from the services require different bearers and are accordingly also indicated in broken and continuous lines, corresponding to the bearer to which they are forwarded by the down link packet filters (DL PF).

Two application functions (App1, App2) are executed in the user equipment (UE2) which consists of a personal computer as executing unit (EU2) and a mobile phone as transmission unit (TU2). The first application function App1 generates two data packet flows, each with characteristics which demand different treatment in the network. This is again indicated by broken and continuous outlines corresponding to the outlines of the bearer which shall be used. Also the data packets (DP, DP') are indicated in continuous and broken lines, corresponding to the respective bearer. Examples of applications which generate a plurality of packet flows are multimedia and presence applications which combine e.g. a voice over IP service with other services such as video, chat, whiteboard and file sharing. A second application function App2 generates only a single data packet flow.

The proposed method provides a mechanism for a mapping between the data packet flows and the bearers. Although the example describes a split user equipment with distinct devices the method is also applicable if the applications are executed on a device comprising both the executing unit and the transmission unit.

The executing unit marks the data packets of the different application flows with the destination for which they are intended. In the example, this is achieved by the network instructing the executing unit to mark the different application flows with a particular combination of a destination IP address and destination port number through application-layer signaling using, e.g., SIP/SDP. Generally, the functionality of signaling a routing level identification may be part of any session-level protocol.

UL Packet Filters (UL PF) are established in the transmission unit and provide a mapping of the packets onto the different bearers to which the filters are associated. In the proposed solution, this is achieved by the network installing filters as a part of the session management protocol procedures, e.g., the PDP context setup or modification. The filters use the routing level identification, e.g. the combination of destination IP address and port number for the mapping of packets onto the bearers. It is possible that other parameters are checked in addition by the packet filters. For example, further filtering can be based on the source address, the source port number, a differentiated services code point (DSCP), the protocol identification, further fields in the IP header or any combination of such parameters. This enables a finer granularity of the mapping.

Using the uplink filters, the network can control the association of an uplink data packet with one of multiple packet bearers in a user equipment of a communication network, wherein the uplink data packet originates from an application function, and the packet bearer is established between the user equipment and the network infrastructure. The method identifies a flow of uplink data packets that is subject to control and determines the packet bearer to be associated with said flow of uplink packets. This determination is performed in the network. The routing level identification of said flow of uplink data packets is also identified in the network. The association of the routing level identification with the determined packet bearer is provided to the user equipment. The uplink data packet is associated with the determined packet bearer in the user equipment based on the association provided from the network.

The steps of identifying a flow subject to control and determining the packet bearer can be based on operator policy rules. A preferable routing level identification is the IP flow 5-tuple or a subset of the IP flow 5-tuple, in particular the destination IP address and destination port number. The identification of the flow of uplink data packets and the related routing level identification is preferably based on analyzing flow descriptions included in session level signaling messages sent between the application function and the receiving application entity, e.g. based on protocols using SDP, like SIP or RTSP. The routing level identification can be included in a session level signaling message destined to said application function, in the form of the destination IP address and port number to be used in uplink data packets from the application function. The provision of the association of routing level identification with a packet bearer can be done at the establishment of the packet bearer. Alternatively, the provision can be done for a packet bearer that has been established previously.

Figure 4:
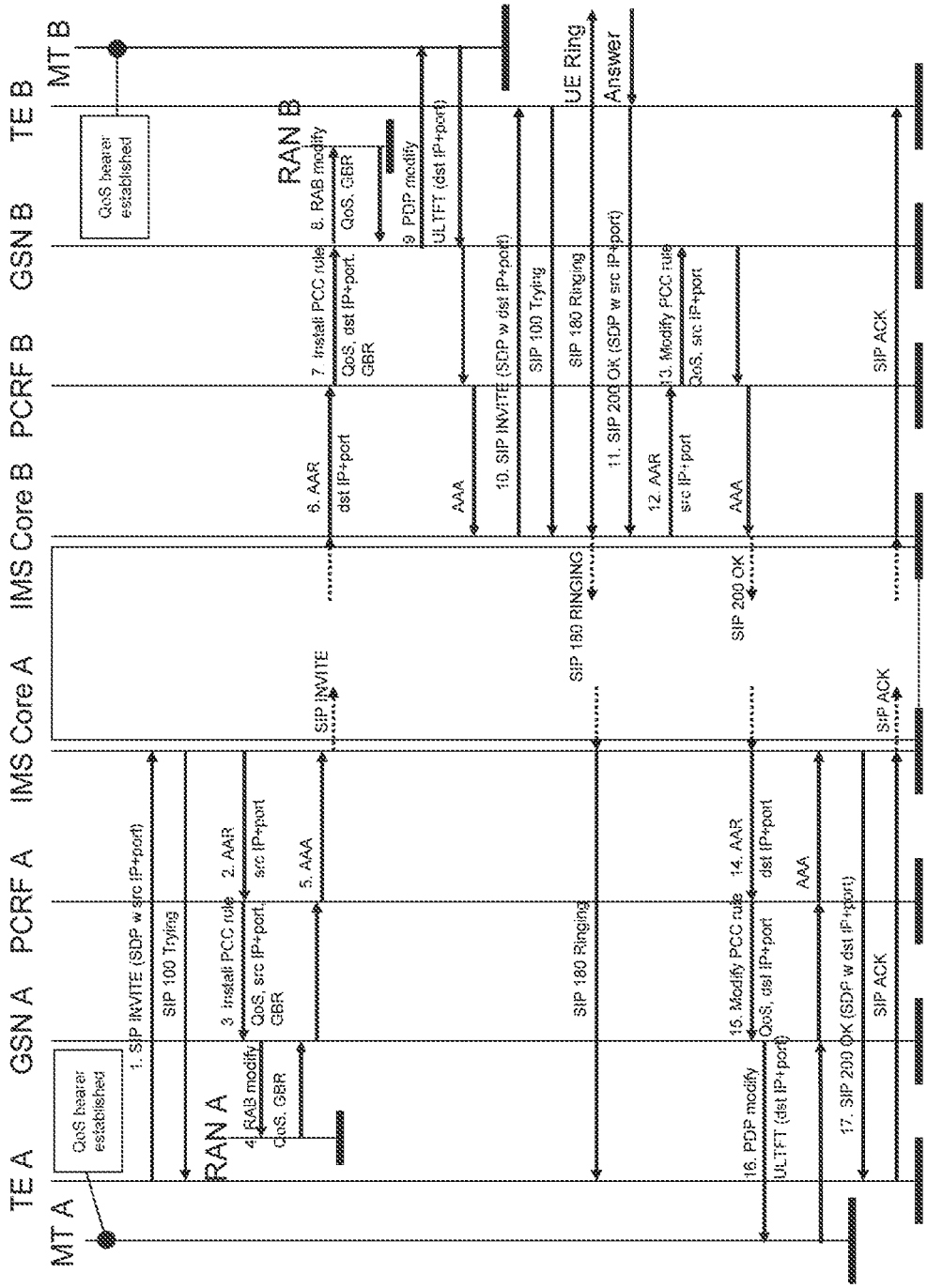
FIG. 4 shows a signaling diagram for implementing the proposed method.
Figure 5:
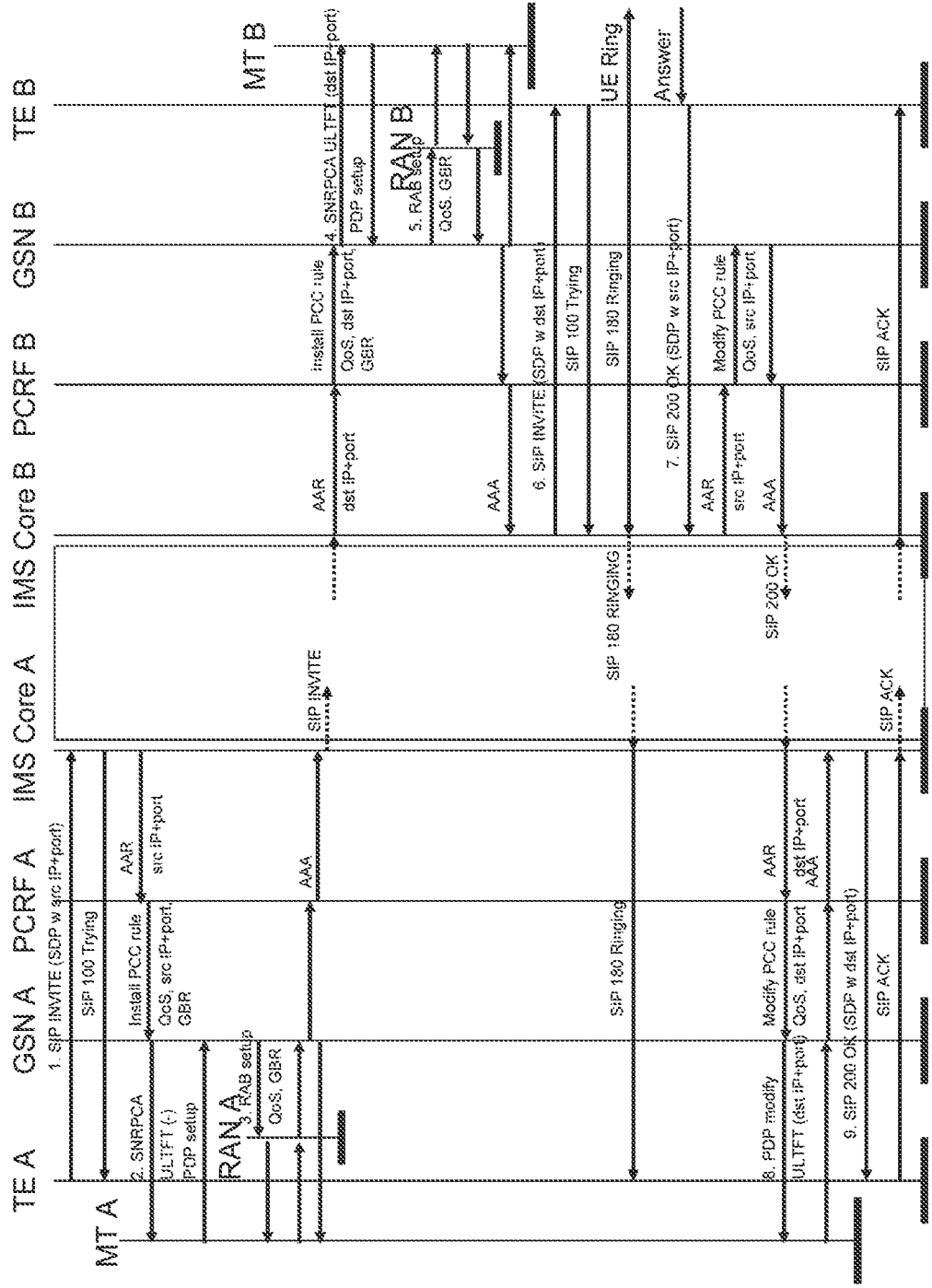
FIG. 5 shows a further signaling diagram for implementing the proposed method.
Figure 6:
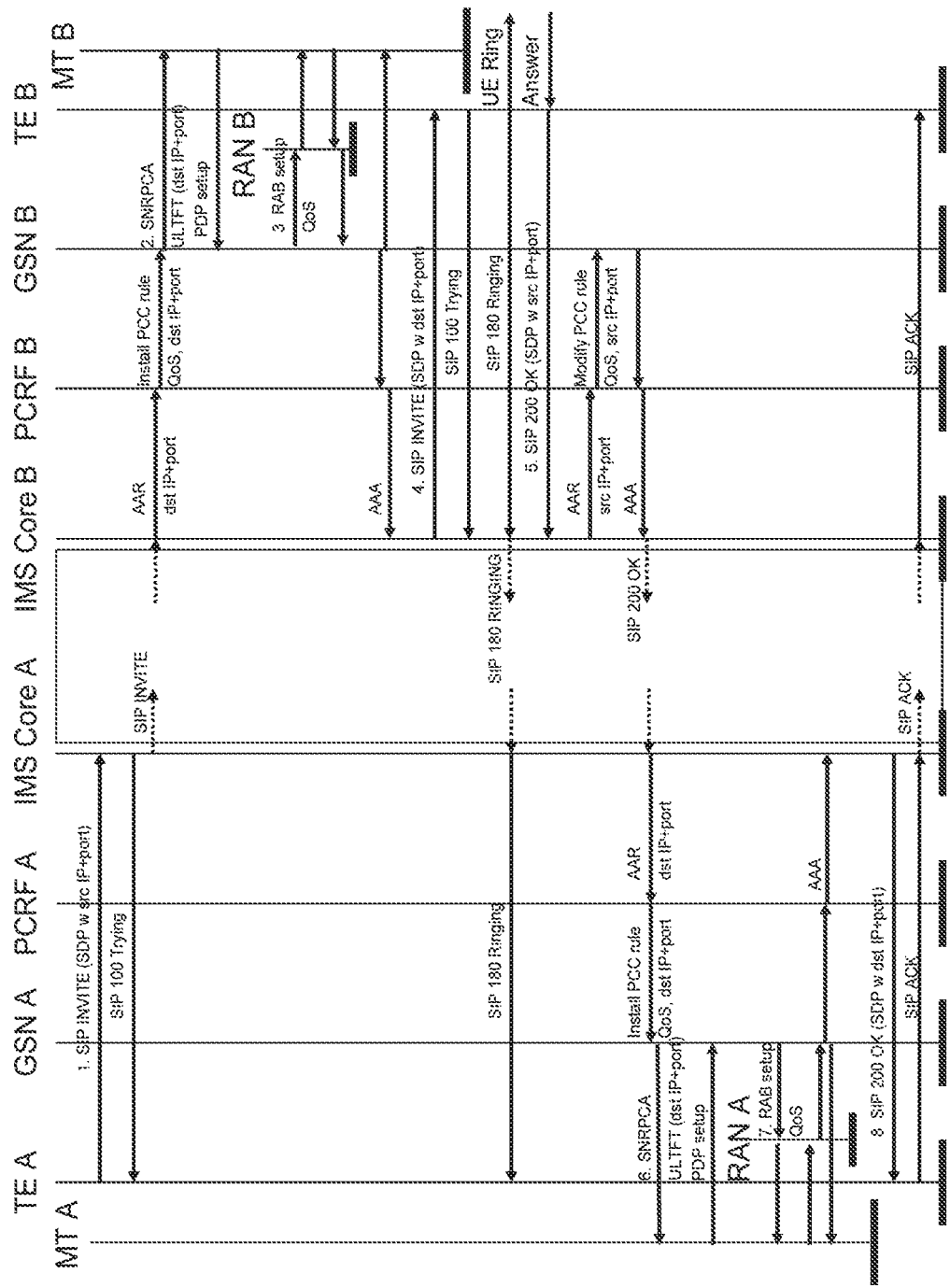
FIG. 6 shows a third signaling diagram for implementing the proposed method.

FIGS. 4-6 show examples of signaling sequences for installing a packet filter in a user equipment during the setting up of a SIP based session in a 3GPP communication network. Similar sequences would also apply to RTSP/SDP sessions. It is assumed in the examples that the PDP context used to carry the SIP signaling is already established when the session is initiated. The preceding signaling for setting up this PDP context is therefore not shown. PDP contexts can for example be set up according to a request from the network, e.g. a Secondary Network Requested PDP Context Activation (SN-RPCA). Correspondingly, SNRPCA signaling can be used to install the packet filters in the user equipment.

In all examples, both the user equipment and the further entity are a user equipment of a 3GPP communication system, i.e. the session is set up between an originating and a terminating mobile user equipment, both connected to a 3GPP network. In many other cases, at least one of them will be in another type of network, e.g. in a fixed network. The originating and terminating network may be connected by one or more intermediate networks forwarding the signaling between the networks as indicated by a rectangle. Aspects of the signaling sequence may be changed, e.g. according to future standardization of the messages.

SIP/SDP signaling is used to instruct the user equipments, here IMS (IP Multimedia Subsystem) Clients, how to mark the data packets. Concerning the designation of information elements in the messages shown, addresses and port numbers are designated from the point of view of the respective side, i.e. the source (src) of the A-side is the destination (dst) of the B-side and vice versa.

Both user equipments comprise a mobile terminal (MT A, MT B) and a terminal equipment (TE A, TE B). The signaling sequences do not require signals between the mobile terminal and the terminal equipment. Accordingly, they are applicable even if no control interface between these two entities exists.

A GPRS Support Node (GSN A, GSN B), for example a gateway GSN, is the edge node of the mobile core network in the examples. SIP signaling is forwarded and inspected by a node designated as IMS Core A, IMS Core B as monitoring entity. In a typical 3GPP network, this can be the P-CSCF (Proxy-Call State Control Function). Policies, e.g. for admission control, and charging rules defined by the operator are enforced by a Policy and Charging Rules Function (PCRF A, PCRF B) as control entity.

In the example of FIG. 4, the packet bearer for carrying the data packets of the initiated session with the associated PDP context has been established prior to session initiation. The corresponding signaling is accordingly not shown. The following signaling messages of the diagram are described in detail:

1. Terminal equipment TE A sends a SIP INVITE message to node IMS Core A. The message includes SDP parameters which contain the IP address and port number to be used at the A side of the session. Node IMS Core A monitors the SIP traffic.
2. Node IMS Core A sends an AAR (Authorization Authentication Request) message to control entity PCRF A, containing the IP address and port number to be used at the A side of the session and a Service Identifier, with which the PCRF can identify the service invoked.
3. Control entity PCRF A sends an "Install PCC Rule" message to edge node GSN A indicating which QoS class should be used for the bearer to carry packets from this service. PCRF A includes the IP address and port number to be used at the A side of the session which can be used for gating control in the core network and, optionally, a GBR (Guaranteed Bit-Rate) value which can be used to carry out admission control in the access network.
4. A RAB (Radio Access Bearer) Modify procedure is carried out, in which resources are reserved for the specified GBR and QoS class. If the procedure is successful, i.e., resources can be reserved in radio access network RAN A, the setting up of the session proceeds.
5. Upon reception of an AAA (Authorization Authentication Answer) message, node IMS Core A forwards the message SIP INVITE received in Step 1 to node IMS Core B, optionally via one or more intermediate networks.
6. Upon reception of the SIP INVITE message, node IMS Core B sends an AAR message to control entity PCRF B, containing the IP address and port number to be used at the A side of the session and a Service Identifier, with which PCRF B can identify the invoked service.
7. Control entity PCRF B sends an "Install PCC Rule" message to edge node GSN B indicating which QoS class should be used for the bearer to carry packets from this service. PCRF B includes the IP address and port number to be used at the A side of the session, which are intended to be used by terminal equipment TE B in the packet filter. They can also be used for gating control and filtering in the core network, e.g. by GSN B. In the message, a GBR (Guaranteed Bit-Rate) value can be included to carry out admission control in the access network.
8. A RAB Modify procedure is carried out, in which resources are reserved for any specified GBR and QoS class. If this procedure is successful, i.e., if resources can be reserved in radio access network RAN B, the setting up of the session proceeds.
9. A procedure to modify the PDP Context associated with the media bearer is initiated. This procedure installs the packet filter selecting packets according to destination IP address and port number in terminal equipment TE B.
10. Node IMS Core B forwards the SIP INVITE message to terminal equipment TE B. The SDP parameters contain the IP address and port number to be used at the A side of the session. Correspondingly, they can be inserted into the data packets originating from an application function residing in TE B. If the application function that has been initiated requires acceptance by the user, the IMS client in TE B rings or gives another indication of the user that a session shall be set up. Other sessions may be initiated without user confirmation.
11. When the user confirms the session establishment, e.g. by picking up at TE B, a SIP 200 OK message is sent from TE B to IMS Core B. This message contains IP address and port number to be used at the B side of the session.
12. Node IMS Core B sends an AAR message to control entity PCRF B, containing the IP address and port number to be used at the B side of the session.
13. PCRF B message sends a "Modify PCC Rule" message to edge node GSN B containing the IP address and port number to be used at the B side of the session as well as the QoS class to be used for the session. This information can be used at GSN B to perform gating control and filtering of incoming packets.
14. After receiving the forwarded message SIP 200 OK, node IMS Core A monitors the content of the message and sends an AAR message to PCRF A, containing the IP address and port number to be used at the B side of the session.

15. Control node PCRF A sends a "Modify PCC Rule" message to GSN A containing the IP address and port number to be used at the B side of the session as well as the QoS class to be used for the session. This information can be used at the GSN to perform gating control and filtering of incoming packets.
16. A procedure to modify the PDP Context associated with the media bearer is initiated. This procedure installs the packet filter containing destination IP address and port number in terminal equipment TE A.
17. Node IMS Core A forwards the SIP 200 OK message to TE A. The SDP parameters in this message contain the IP address and port number to be used at the B side of the session. Correspondingly, they can be inserted into the data packets originating from an application function residing in TE A.

Finally, an acknowledgement for the successful set up of the session is sent between the involved user equipments.

In summary, on the A-side, an uplink packet filter is installed using the PDP context modification procedure, once the destination IP address and port are known, i.e. after receiving the SIP 200 OK message including this information from the B-side. On the B-side, the uplink filter can be installed with the PDP context modification procedure directly, since the destination IP address and port are known from the SIP INVITE message. The RAB modify signals to the RAN in steps 4 and 8 are only relevant if resource reservation is required. If resource reservation is not used in the RAN the RAB modify signals can be omitted from the signaling. A variety of associations are possible for the packet filter which can be used for example to map packets onto bearers with different QoS characteristics. In addition, the packets can be mapped to different APNs or charged differently. Combinations are also possible.

The above method can also be used for other access networks apart from the 3GPP-network in the above example because the application layer signaling protocol is access agnostic. Only the signaling used for the installation of the uplink packet filter needs to be adapted to the different access network. One main advantage of the method is that applications executed in the user equipment do not need to support specific procedures on the API to handle the quality of service.

Any communication to lower layers is made through a standard socket API. This simplifies application development significantly.

FIG. 5 shows an example, in which the media bearer is established during the session setup. Only selected messages are described while several messages serving the same purpose as the corresponding messages in FIG. 4 are shown in FIG. 5 without repetition in the text below. The following steps are taken
1. Terminal equipment TE A sends a SIP INVITE message to IMS Core A. The message comprises SDP parameters which contain the IP address and port number to be used at the A side of the session.
2. An SNRPCA procedure is initiated on the A side for requesting a setup of a PDP context by mobile terminal MT A. In this procedure, an uplink packet filter cannot be installed in TE A, since the destination IP address and port number are still unknown.
3. As part of the PDP Context activation, a RAB is established. A resource reservation procedure can also be carried out in RAN A.
4. A further SNRPCA procedure is initiated on the B side for requesting a setup of a PDP context by mobile terminal MT B. In this procedure, an uplink packet filter is installed in TE B for selecting packets according to destination IP address and port number.
5. A RAB is established on the B side as part of the SNRPCA procedure.
6. Node IMS Core B forwards the SIP INVITE message to TE B. The SDP parameters contain the IP address and port number to be used at the A side of the session. Correspondingly, they can be inserted into the data packets originating from an application function residing in TE B.
7. The SIP 200 OK message contains IP address and port number to be used at the B side of the session. This message is forwarded to node IMS Core A at the A side.
8. Once the IP address and port number to be used at the B side of the session are received at GSN A, the PDP Modify procedure can be triggered. This procedure updates the PDP context with the uplink packet filter based on the destination IP address and port number.
9. IMS Core A forwards the SIP 200 OK message to TE A. The SDP parameters in this message contain the IP address and port number to be used at the B side of the session. Correspondingly, they can be inserted into the data packets originating from an application function residing in TE A.

In summary, on the A-side the bearer is setup using an SNRPCA procedure before the parameters required for installing the uplink packet filter are available. Since the destination IP address and port to be used at the B side are not known until after receiving this information from the B-side, the uplink filter is updated later in the sequence using a PDP context modification procedure. On the B-side, the bearer is setup and the uplink packet filter is installed during this procedure, since IP address and port are known from the SIP INVITE message.

FIG. 6 shows a third signaling sequence for installation of an uplink filter. As in the previous example, only selected messages in the sequence are described while the purpose of other messages in the figure corresponds to those in FIG. 4. In this example, the uplink packet filter on the A-side is installed together with the setup of the bearer. The following steps are taken
1. Terminal equipment TE A sends a SIP INVITE message to node IMS Core A. It includes SDP parameters with the IP address and port number to be used at the A side of the session. This message is forwarded to IMS Core B without carrying out resource reservation in the radio access network or setting up a bearer.
2. An SNRPCA procedure is initiated on the B side. In this procedure, an uplink packet filter is installed in TE B for selecting packets according to destination IP address and port number.
3. A RAB is established on the B side as part of the SNRPCA procedure.
4. Node IMS Core B forwards the SIP INVITE message to TE B. The SDP parameters contain the IP address and port number to be used at the A side of the session. Correspondingly, they can be inserted into the data packets originating from an application function residing in TE B.
5. The SIP 200 OK message contains IP address and port number to be used at the B side of the session. This message is forwarded to the A side.
6. Once the IP address and port number to be used at the B side of the session are received at GSN A, a further SNRPCA procedure is triggered to setup a PDP context at the A side. The procedure also installs an uplink packet filter for selecting packets according to destination IP address and port number.

7. A RAB is established on the A side. If no resource reservation is used in the RAN, a GBR value is not required in this message. If resource reservation is used, a GBR value can be included.

8. Node IMS Core A forwards the SIP 200 OK message to TE A. The SDP parameters in this message contain the IP address and port number to be used at the B side of the session. Correspondingly, they can be inserted into the data packets originating from an application function residing in TE A.

In this example, on both the A-side and B-side the uplink filter is installed together with the setup of the bearer using a network-requested PDP context activation. Correspondingly, the setup of a bearer on the A-side is delayed until the reception of the information about the destination IP address and port number from the B-side.

Figure 7:
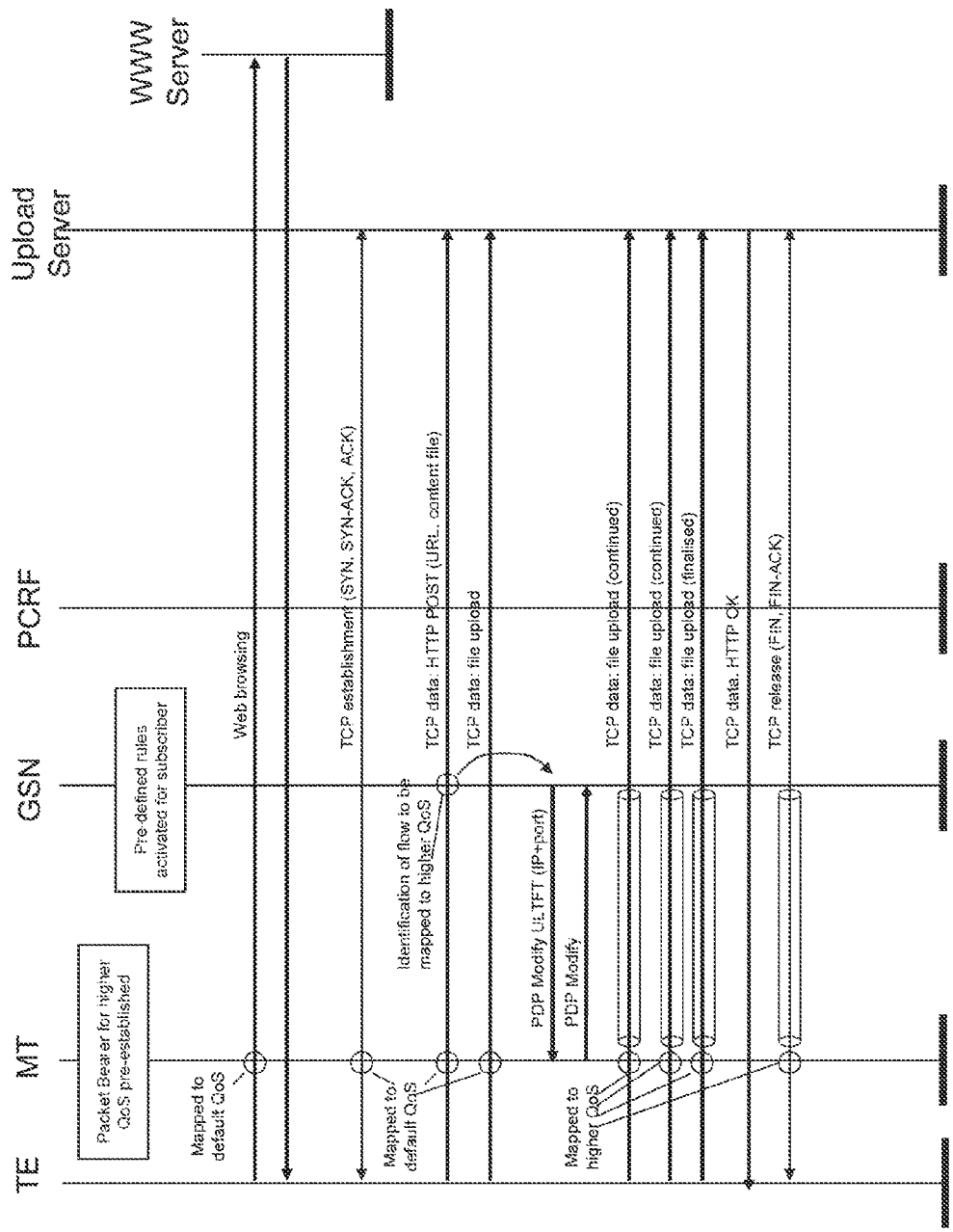
FIG. 7 shows a fourth signaling diagram for implementing the proposed method.

The example of FIG. 7 shows a signaling sequence in which the filter of a pre-established bearer is modified for content upload. As in the preceding examples, the user equipment comprises a terminal equipment TE and a mobile terminal MT and the data transmission is performed via a GSN and controlled by a PCRF.

Before the start of the illustrated sequence, a packet bearer has been established between the network and the user equipment.

Initially the user is browsing, e.g. visiting sites on a WWW server. Data packets transmitted during the browsing are mapped to a bearer with default QoS. The user activates an upload of a file from the user equipment to an upload server, e.g. to a webblog server. The file upload is started with the default QoS but the data packets correspond to a new flow. A control entity in the network, e.g. the GSN or another node in the operator's network, detects the new flow, e.g. by identifying that it is directed to a specific URL or IP address. According to the subscription of the user, a rule is activated in the control entity that determines that an uplink flow to the specific URL or IP address should be mapped to a higher QoS.

The control entity then initiates an update of the uplink packet filter in the user equipment. In the example shown, this a done using PDP Modify procedure. Alternatively, the PDP modify could be replaced with a procedure for setting up an additional PDP context, e.g. an SNRPCA sequence. In both cases, the upload continues preferably in parallel, using the default QoS. When the filter in the user equipment is updated, the upload continues on a bearer with a higher QoS. This ensures priority over other traffic from the user equipment and other entities in the network.

Figure 8:
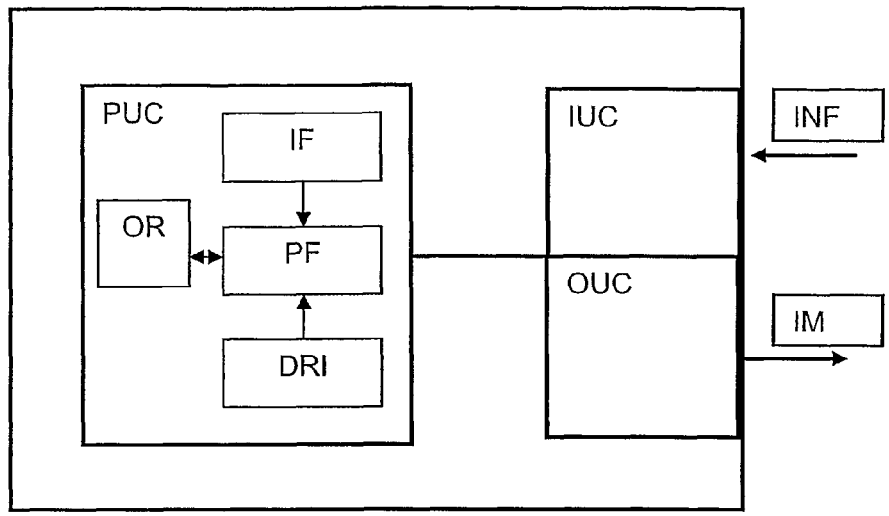
FIG. 8 shows a control device adapted to perform the proposed method.

A control entity according to the invention is shown in FIG. 8. It initiates the association of a data packet with a packet bearer in a user equipment of the communication network in which the packet bearer is adapted to transmit the data packet to a further entity. The control entity comprises an input unit (IUC) to receive information (INF) related to the flow for the data packet. A processing unit (PUC) is adapted to identify the flow in an identification function (IF). For example, the identification function (IF) can evaluate the message (INF) for this purpose. A policy function (PF) is adapted to determine the packet bearer for association with said flow from the different packet bearers available to the user equipment. Preferably, the control device comprises a memory with operator defined rules (OR) as basis for the determination. A determination function (DRI) determines a routing level identification of the further entity. The determination function (DRI) can for example also evaluate the information message (INF) or another message comprising this information.

An output unit (OUC) is adapted to instruct the user equipment to install a packet filter based on the routing level identification, the packet filter associating data packets comprising the routing level identification of the further entity with the determined packet bearer. The instruction is preferably performed by an instruction message (IM) to the user equipment.

Figure 9:
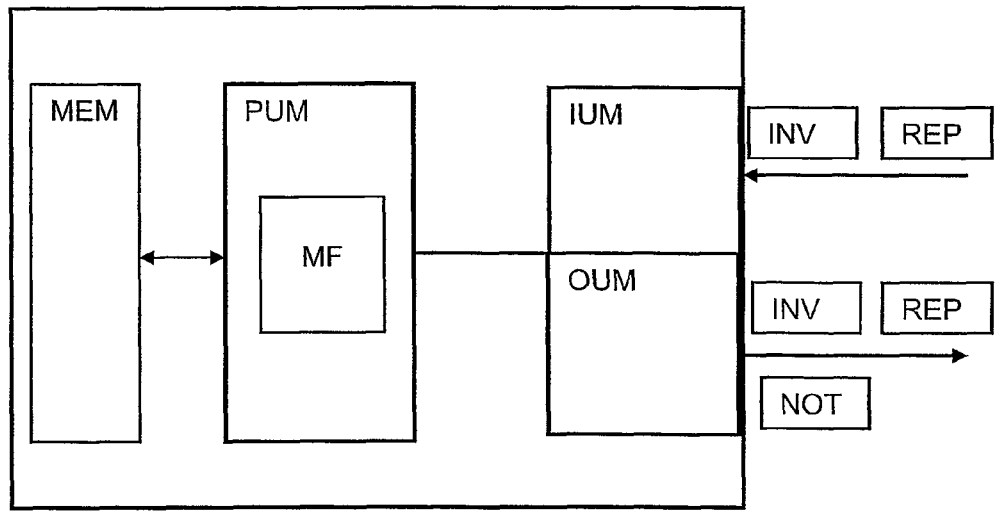
FIG. 9 shows a monitoring device for use in the proposed method.

FIG. 9 shows a monitoring entity for a communication network with a user equipment. The monitoring entity comprises an input unit (IUM) adapted to receive an initiation message (INV) comprising a session level identification of the further entity. The initiation message (INV) initiates an establishment of a communication session between the user equipment and the further entity. The input unit (IUM) is preferably also adapted to receive a reply message (REP) to the initiation message. It is not necessary that the reply message is sent via and received by the monitoring entity if the initiation message comprises all information required to perform the proposed method such as the SIP invite message on the B-side of the embodiment in FIG. 4.

A processing unit (PUM) is adapted to monitor the messages in a monitoring function (MF) and to determine a routing level identification of the further entity from the initiation message (INV) or from the reply message (REP). An output unit (OUM) is adapted to forward the initiation message towards the further entity using the session level identification and, if required, to forward the reply message (REP) to the user equipment.

The monitoring entity is further adapted to forward the determined routing level identification to a control entity for instructing the user equipment to install a packet filter based on the routing level identification. For this purpose, a notification (NOT) can be sent via the output unit (OUM) to the control entity.

Preferably, the monitoring entity comprises a memory (MEM) for storing an information related to the communication session. The information allows especially associating initiation message (INV) and reply message (REP) with each other and the session.

The units and functions of the control entity and the monitoring entity can be embodied as electronic or optical circuitry or as software executed in such circuitry. The input and output units of both devices may be integrated in a common I/O unit.

The above embodiments admirably achieve the objects of the invention. However, it will be appreciated that departures can be made by those skilled in the art without departing from the scope of the invention which is limited only by the claims.

The invention claimed is:

1. A control entity for a communication network with a user equipment (UE1), wherein an application function of the user equipment is for sending a data packet in a data flow, a packet bearer (PB) being established with the user equipment to transmit the data packet (DP) over the communication network towards a further entity, and wherein the user equipment is for establishing different packet bearers, the control entity comprising:

an input unit for receiving the flow the data packet or information related to the flow, a processing unit (PUC) with an identification function (IF) for identifying the flow, comprising a policy function (PF) for determining the packet bearer for association with said flow from the different packet bearers, and a determination function (DRI) for determining a routing level identification of the further entity, and an output unit for instructing the user equipment to install a packet filter based on the routing level identification, wherein the packet filter associates data packets comprising the routing level identification of the further entity with the determined packet bearer.

2. A monitoring entity for a communication network with a user equipment (UE1), wherein an application function of the user equipment is for sending a data packet in a data flow, a packet bearer (PB) being established with the user equipment to transmit the data packet (DP) over the communication network towards a further entity, and the user equipment also for establishing different packet bearers, the monitoring entity comprising:

an input unit for receiving an initiation message comprising a session level identification of the further entity, the initiation message initiating an establishment of a communication session between the user equipment and the further entity, and for receiving a reply message to the initiation message, a processing unit for monitoring the messages and for determining a routing level identification of the further entity from the initiation message or from the reply message, an output unit for forwarding the initiation message towards the further entity using the session level identification and for forwarding the reply message to the user equipment, the monitoring entity also for forwarding the determined routing level identification to a control entity for instructing the user equipment to install a packet filter based on the routing level identification, wherein the packet filter associates data packets comprising the routing level identification of the further entity with the determined packet bearer.

3. The monitoring entity according to claim 2, wherein the monitoring entity comprises a memory (MEM) for storing an information related to the communication session.

4. A method in a user equipment of a communication network for associating a data packet with a packet bearer, wherein the user equipment sends the data packet from an application function in a data flow, and comprises means for establishing the packet bearer to transmit the data packet over the communication network towards a further entity, and wherein the user equipment is adapted to establish different packet bearers, the method comprising the steps of:

receiving an instruction by the user equipment from the communication network to install a packet filter based on a routing level identification of the further entity, wherein the packet filter associates data packets of the flow comprising the routing level identification of the further entity with a determined packet bearer from the different packet bearers;

providing the routing level identification to the application function, including the routing level identification into the data packet; and forwarding the data packet on the determined packet bearer.

5. The method according to claim 4, wherein the routing level identification of the further entity is determined and a control entity of the communication network receives the determined routing level identification from a monitoring entity and instructs the user equipment to install the packet filter.

6. The method according to claim 5, the method comprising the steps of initiating an establishment of a communication session between the user equipment and the further entity by an initiation message comprising a session level identification of the further entity;

storing an information related to the communication session in the monitoring entity adapted to monitor messages sent between the user equipment and the further entity for establishing the session;

forwarding the initiation message towards the further entity using the session level identification;

waiting by the monitoring entity for a reply message related to the establishment of the communication session;

determining the routing level identification of the further entity from the reply message;

forwarding the reply message to the user equipment; and completing the session establishment.

7. The method according to claim 4, wherein initial packets sent by the user equipment on a first bearer are inspected, wherein the flow is identified from the inspected data packets, and wherein the packet bearer determined for association with said flow is a second packet bearer.

8. The method according to claim 4, wherein the setup of a packet bearer is initiated by a request from a node in the communication network.

9. The method according to claim 4, wherein the different packet bearers differ in at least one associated item selected from a group consisting of a quality of service, a charging tariff, and an access point to which the packet is forwarded.

10. The method according to claim 4, wherein the user equipment comprises an executing unit for executing the application function and a transmission unit for sending the data packet on the determined packet bearer.

11. The method according to claim 4, wherein the data packet is an internet protocol IP data packet.

12. The method according to claim 4, wherein the routing level identification is at least one of a destination address and a destination port number.

13. The method according to claim 4, wherein the packet bearer is established before installing the packet filter and wherein the packet filter is installed in a modification procedure of the packet bearer.

14. The method according to claim 4, wherein the packet filter associates the data packet with the packet bearer based on at least one further parameter.

15. A user equipment of a communication network, the user equipment comprising means for associating a data packet with a packet bearer, wherein the user equipment is adapted to send the data packet from an application function in a data flow, and comprises means for establishing the packet bearer to transmit the data packet over the communication network towards a further entity, and wherein the user equipment is adapted to establish different packet bearers, the user equipment comprising:

means for receiving an instruction from the communication network to install a packet filter based on a routing level identification of the further entity, wherein the packet filter associates data packets of the flow comprising the routing level identification of the further entity with a determined packet bearer from the different packet bearers;

means for providing the routing level identification to the application function;

means for including the routing level identification into the data packet; and means for forwarding the data packet on the determined packet bearer.

* * * * *

UNITED STATES PATENT AND TRADEMARK OFFICE
CERTIFICATE OF CORRECTION

| | | |
|---|---|---|
| PATENT NO. | : 8,817,610 B2 | Page 1 of 1 |
| APPLICATION NO. | : 13/010137 | |
| DATED | : August 26, 2014 | |
| INVENTOR(S) | : Willars et al. | |

It is certified that error appears in the above-identified patent and that said Letters Patent is hereby corrected as shown below:

In the Claims

In Column 16, Line 61, in Claim 1, delete "flow" and insert -- flow with --, therefor.

In Column 17, Line 64, in Claim 6, delete "of" and insert -- of: --, therefor.

Signed and Sealed this
Eighteenth Day of August, 2015

Michelle K. Lee
*Director of the United States Patent and Trademark Office*